UNITED STATES PATENT OFFICE.

JOHANNES JANSEN AND WILHELM NEELMEIER, OF LEVERKUSEN, NEAR COLOGNE, GERMANY, ASSIGNORS TO FARBENFABRIKEN VORM. FRIEDR. BAYER & CO., OF ELBERFELD, GERMANY, A CORPORATION OF GERMANY.

AZO DYE.

No. 924,231.    Specification of Letters Patent.    Patented June 8, 1909.

Application filed February 3, 1909. Serial No. 475,815.

*To all whom it may concern:*

Be it known that we, JOHANNES JANSEN and WILHELM NEELMEIER, doctors of philosophy, chemists, citizens of the German Empire, residing at Leverkusen, near Cologne, Germany, have invented new and useful Improvements in Azo Dyes, of which the following is a specification.

Our invention relates to the manufacture and production of new coloring matters capable of dyeing on a mordant.

The new dyestuffs are obtained by combining the diazo compounds of such ortho-aminophenol derivatives which contain either nitro groups or halogens or both nitro groups and halogens but no sulfonic or carboxylic groups with beta-beta-aminonaphthols and their derivatives alkylated or arylated in the amino group.

The new products possess the valuable property that they can be dyed on wool together with bichromate in the same bath. They can also be dyed on a chrome mordant or according to the after-chroming method. The dyeing in one bath is best done by adding the dye with the bichromate to the bath, entering the wool, boiling, adding acetic acid in small portions and boiling again. Black shades are obtained.

The new dyestuffs are dark powders soluble in water generally with a violet color, and soluble in concentrated sulfuric acid generally with a red color. They yield upon reduction with stannous chlorid and hydrochloric acid aminophenol derivatives and alpha-beta-diamino-beta-oxy-naphthalenes.

In carrying out our new process practically we can proceed as follows, the parts being by weight:

Example:—16.8 parts of 6-methyl-4-nitro-2-aminophenol are diazotized in the usual manner by means of hydrochloric acid and 7 parts of sodium nitrite. The diazo compound is then added to an aqueous solution, which has to be stirred, until the combination is finished, of 159 parts of 2.7-aminonaphthol containing an excess of sodium carbonate. The dyestuff precipitates by acidulation. It is filtered off, pressed and dried. It is a dark powder which is soluble in water with a reddish-violet color and which is soluble in concentrated sulfuric acid with a red color. By reduction with stannous chlorid and hydrochloric acid 6-methyl-2.4-diaminophenol and 2.8-diamino-7-naphthol are obtained. It dyes wool according to the above described method blue-black shades of good fastness to fulling and to light.

The process is carried out in an analogous manner on starting from other beta-beta-aminonaphthols or their alkylated and arylated derivatives *e. g.* 2-phenylamino-7-naphthol, 2-methylamino-7-naphthol etc. Other ortho-aminophenol derivatives may be used, such as 4-chloro-2-aminophenol, 4.6-dichloro-2-aminophenol, 4-nitro-2-aminophenol, 5-nitro-2-aminophenol, picramic acid, 6-chloro-4-nitro-2-aminophenol, 6-nitro-4-chloro-2-aminophenol, 4-methyl-6-nitro-2-aminophenol, 2.4-dinitro-3-methyl-6-aminophenol, 5-nitro-4-chloro-2-aminophenol etc.

Having now described our invention and in what manner the same is to be performed, what we claim as new and desire to secure by Letters Patent is:—

1. The herein-described new azo dyestuffs, obtainable from ortho-aminophenol derivatives containing nitro groups or halogens or both nitro groups and halogens but no sulfonic and carboxylic groups and beta-beta-aminonaphthol and their derivatives substituted in the amino group, which dyestuffs are, after being dried and pulverized, dark powders soluble in water generally with a violet color, soluble in concentrated sulfuric acid generally with red color; yielding upon reduction with stannous chlorid and hydrochloric acid ortho-aminophenol derivatives and alpha-beta-diamino-beta-oxynaphthalenes; and dyeing wool together with bichromate and acid in the same bath black shades, substantially as described.

2. The herein-described new azo dyestuff obtainable from 6-methyl-4-nitro-2-aminophenol and 2.7-aminonaphtl.ol, which dyestuff is, after being dried and pulverized, a dark powder soluble in water with a reddish-violet color and soluble in concentrated sulfuric acid with a red color, yielding upon reduction with stannous chlorid and hydrochloric acid 6-methyl-2.4-diaminophenol and 2.8-diamino-7-naphthol; and dyeing wool together with bichromate and acid in the same bath blue-black shades fast to fulling and to light, substantially as described.

In testimony whereof we have hereunto set our hands in the presence of two subscribing witnesses.

JOHANNES JANSEN. [L. S.]
WILHELM NEELMEIER. [L. S.]

Witnesses:
OTTO KÖNIG,
WM. WASHINGTON BRUNSWICK.